United States Patent Office 3,502,750
Patented Mar. 24, 1970

---

3,502,750
PROCESS FOR THE PREPARATION OF DIALKYL PHOSPHOROCHLORIDOTHIOATES
Paul Anglaret, L'Hay-les-Roses, and Jean Francois Corbin, Montgeron, France, assignors to Rhone-Poulenc S.A.
No Drawing. Filed Oct. 7, 1966, Ser. No. 584,959
Claims priority, application France, Oct. 12, 1965, 34,718
Int. Cl. C07f 9/20
U.S. Cl. 260—986                              4 Claims

---

ABSTRACT OF THE DISCLOSURE

Lower alkyl esters of phosphorochloridothioic acid are produced by reaction of chlorine with a lower alkyl ester of dithiophosphoric acid and freeing the product of sulfur monochloride by reaction with hydrogen sulfide, preferably formed during the production of the dithiophosphoric acid ester by reaction of a lower alkanol with phosphorus pentasulfide. The O,O-dialkyl phosphorochloridothioates are intermediates in the preparation of insecticides.

---

This invention relates to the preparation of esters of phosphorochloridothioic acid. The compounds have the general formula

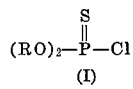

(I)

in which R stands for a saturated alkyl radical containing between 1 and 6 carbon atoms inclusively. The compounds of this invention are also called O,O-dialkyl chlorothiophosphonates, or they may be viewed as diesters of chlorothiophosphoric acid chloride. They are characterized by the presence of two ester groups in addition to the acid chloride group.

The O,O-dialkyl phosphorochloridothioates are valuable intermediates, for instance, in the preparation of insecticides.

Among the several methods which have been used for the synthesis of the esters of phosphorochloridothioic acid, of Formula I, one method involves a two-step process, which requires first the preparation of a diester of dithiophosphoric acid, and in a second step, the reaction of the latter with chlorine. The first step is represented by Equation II below:

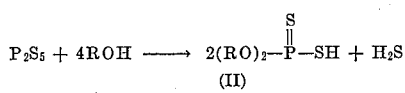

(II)

With respect to the second step, the reaction of the dialkyl dithiophosphoric acids with chlorine, one procedure consists of carrying out the reaction with equimolar quantities of the reactants and is represented by Equation III below:

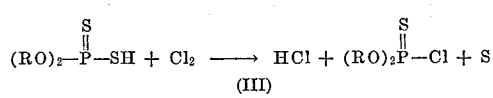

(III)

The reaction according to Equation III gives generally a yield lower than 75%, based on the dialkyl dithiophosphate used. Another disadvantage of this procedure is that the product, the diester of phosphorochloridothioic acid, must be separated by distillation. The secondary reaction products which are found mixed with sulfur in the tarry residue from the distillation, are of such nauseating odor, that the disposal of the residue, presents health problems.

According to another procedure, the reaction of the dialkyl dithiophosphoric acid with chlorine, is conducted in the molar ratio 2:3, as represented by Equation IV below:

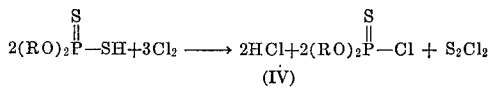

(IV)

The reaction according to Equation IV gives a better yield of the desired product than according to Equation III above, but it presents additional problems, mainly in the elimination of the sulfur monochloride. Several procedures have been suggested for the elimination of sulfur monochloride, but they represent only a partial solution to the problem. They are:

(1) Distillation of the reaction mixture. The main disadvantage here is that the yield is lowered, because sulfur monochloride reacts, at the high temperature at which distillation is conducted, with the desired reaction product, the diester of phosphorochloridothioic acid.

(2) Addition of water and hydrolysis of the sulfur monochloride. It has been found, however, that addition of water causes precipitation of a gummy material, which contains amorphous soft sulfur, and that the latter substantially interferes with the isolation of the diester of the phosphorochloridothioic acid.

(3) Reaction of sulfur monochloride with a sulfite. This procedure is satisfactory, insofar as it gives high yields of the desired products but substantial quantities of the reagent, the sulfite, are required. Moreover, there are formed side-products, such as bisulfites, hyposulfites and polythionates. The solution, containing these substances, may not be directly thrown into the drain, and their disposal presents difficulties. For this reason, the advantage achieved by the increase in yield, is practically lost.

It has also been proposed to prepare the diesters of phosphorochloridothioic acid by a one-step reaction of phosphorous pentasulfide, an alcohol and chlorine in the molar ratio 1:4:3, according to Equation V below:

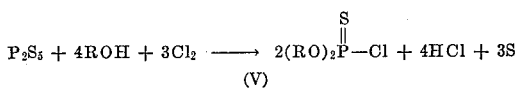

(V)

This procedure, although it is attractive because it involves a simple one-step reaction, is far from satisfactory because the yields are low, in the range of 60–73%, based on the phosphorous pentasulfide.

The object of this invention is to provide a novel process for the preparation of the diesters of phosphorochloridothioic acid, the compounds of general Formula I above, in high yield.

Another object is to provide a process which does not require the difficult separation of by-products, and which is free of the formation of by-products of nauseating odor.

The gist of this invention resides in the finding that it is possible to react phosphorous pentasulfide with an alcohol ROH, to obtain the intermediate diester of dithiophosphoric acid, then treat the latter in the cold with chlorine and finally treat the reaction mixture with hydrogen sulfide. In this manner, a precipitate of sulfur is obtained, with practically no by-products. By distillation under vacuo, and washing the distillate with water, the diesters of phosphorochloridothioic acid are obtained in very high yield and in a very high degree of purity.

The reaction of the diesters of dithiophosphoric acid with chlorine is facilitated by the addition of phosphorous trichloride, but the latter is not essential to the process of this invention.

According to a preferred embodiment of the invention, it is possible to utilize the hydrogen sulfide which is formed according to Equation II, above. This permits the utilization of hydrogen sulfide, a by-product, without necessitating additional reagents.

It is preferred, although it is not essential, to conduct the reactions in a solvent, and for this purpose, it is particularly advantageous to use the same solvent in each of the reactions. The solvent being selected should be inert to the different components of the reaction mixture as well as to the reaction products, formed in the course of each of the steps described above. Satisfactory as a solvent are the aromatic hydrocarbons, for instance benzene, toluene and xylene, and chlorinated hydrocarbons, such as carbon tetrachloride.

In the selection of the solvent, it is preferable to be guided by the ultimate use of the diesters of phosphorochloridothioic acid which is being contemplated, because since these substances are used as intermediates in many syntheses, a solvent which may be easily eliminated, before the next reaction, or which does not interfere with the subsequent reactions, is to be preferred. It is also possible to select a solvent which may be used as the reaction medium in the subsequent steps, and which does not interfere with the subsequent reactions.

In the actual practice of this invention, the reaction with chlorine is carried out in the cold, at a temperature between −5° and 30° C., preferably between 0° and 10° C. An important feature of the process, within the scope of this invention, is that the proportion of chlorine is not fixed to a definite value, but may be varied within a reasonable range. It has been found, that by operating exactly with the molar proportions given in Equations III or IV above, the yield is not the most satisfactory. Better yields are obtained by reaction of the diester of dithiophosphoric acid with chlorine in the molar ratio of one mole of the former to between 1.25 and 1.55 mole of the latter, and preferably between 1.30 and 1.45 mole of the latter. By operating in accordance with this molar ratio, the amount of chlorine used up is less than the amount required according to Equation IV. Under these conditions, a small amount of free sulfur is obtained, but it does not interfere with the subsequent course of the reaction.

The reaction of hydrogen sulfide with sulfur monochloride follows the course indicated in Equation VI below:

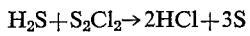

$$H_2S + S_2Cl_2 \rightarrow 2HCl + 3S$$

(VI)

This reaction proceeds at a mild temperature, more specifically between 30° and 40° C., and preferably in the absence of moisture.

After the conversion of sulfur monochloride, the mixture is preferably distilled under vacuo, giving a fraction consisting of the solvent, together with the diester of phosphorochloridothioic acid and with some impurities. The solid residue consists essentially of sulfur. The distillate, after washing with water and drying, consists of a solution of the pure diesters of phosphorochloridothioic acid in the organic solvent used in the preparation. This solution may be used directly in many reactions in which the dialkyl phosphorochloridothioates are used, for instance, for the preparation of dialkyl thiophosphonates.

The following examples are described in detail below, for the purpose of better illustration of the invention.

Example 1

The reaction vessel is a 10-liter 3-necked flask provided with a stirrer, a reflux condenser and an addition funnel. The flask is heated with an electric mantle, and xylene, 2.76 liters, and phosphorous pentasulfide, 2.5 kg., are placed in the flask. The mixture is heated to 90° C., and 2.02 kg. of anhydrous ethanol are added in the course of two hours, while keeping the temperature at 90° C. The hydrogen sulfide, which is evolved during the reaction, is collected in a gasometer.

After the addition of ethanol is complete, the mixture is kept at 90° C. for a period of three hours, in a nitrogen atmosphere; it is then cooled and clarified by filtration.

There is obtained 6.82 kg. of a xylene solution, which, by acidimetric analysis, contains 4.092 kg. of the diethyl ester of dithiophosphoric acid.

The xylene solution obtained above and 44 g. of phosphorous trichloride are placed in a 10-liter Keller flask, cooled with a brine bath and provided with an efficient stirrer. The gaseous material in the upper part of the flask is removed by means of a pump and brought back in the middle of the vortex created by the mechanical agitation, within the flask, at the rate of 260 liters per hour, without dipping in the liquid. The assembly of the gaseous system is provided with an equilibration gasometer laterally arranged. In this manner, provision is made for recycling.

When the temperature reaches 0° C., a current of chlorine is introduced into the gaseous flow just before the flask, at the rate of 360 g./hr. The chlorine, when it arrives in contact with the liquid mass, is diluted first by air, then by the hydrogen chloride produced in the reaction. The excess hydrogen chloride is carried through the gasometer, into a washing column where it is absorbed in water. During the period of time when chlorine is passed through, the inner temperature is kept between 0° and 2° C. After 2.187 kg. of chlorine have been passed through, the operation is stopped, and the reaction mass is poured into a 3-necked 10-liter flask, provided with an efficient stirrer. This flask, and every other vessel communicating with it, is filled with hydrogen sulfide. The mass is heated to 35° C., and a stream of hydrogen sulfide which has been previously formed in the synthesis of the diester of dithiophosphoric acid and collected in the first gasometer, is brought into the gaseous system. The hydrogen chloride, which is formed, entraps, while it is evolved, a substantial proportion of hydrogen sulfide. The mixture of the two gases is passed through a column which contains boiling water, where the hydrogen chloride is selectively absorbed.

The wet hydrogen sulfide, which emerges from the absorbent, is dried countercurrently in a column containing a saturated solution of calcium bromide and is brought back into the reaction mixture by means of a pump. The absorption of hydrogen sulfide is continued by keeping the temperature at 35° C. The rate of fresh hydrogen sulfide which is being introduced into the reaction mixture, is automatically regulated with the supply from the gasometer replacing the gas which is absorbed by the reaction mass. After 85 minutes, the absorption of hydrogen sulfide ceases. This corresponds to a quantity of hydrogen sulfide being absorbed equivalent essentially to the quantity produced in the synthesis of the diethyl ester of dithiophosphoric acid. The hydrogen sulfide which remains dissolved in the reaction mixture, is finally swept away with a stream of nitrogen gas.

The reaction mixture is then distilled under a pressure of 4 mm. of mercury, until the temperature of the mass reaches 150° C. The distillate weighs 6.380 kg. The residue from the distillation weighs 1.385 kg. and consists essentially of sulfur.

The distillate is agitated for 10 minutes with 3.5 liters of water containing 220 g. of sodium carbonate, the organic layer is separated by decantation, and dried over sodium sulfate. The resulting solution, 6.1 kg., contains 3.950 kg. of the diethyl phosphorochloridothioate, and is practically free of impurities. Yield: 95.3%, based on the diethyl dithiophosphoric acid intermediate, 91.5%, based on the phosphorous pentasulfide used.

Example 2

The operation is conducted in the same manner as in the preceding example, from 2.5 kg. of phosphorous pentasulfide and 1.4 kg. of methanol, in 2.65 liters of xylene. The solution, 5.575 kg., contains, on acidimetric titration, 3.275 kg. of the dimethyl ester of dithiophosphoric acid.

The reaction mixture, treated with 2.08 kg. of chlorine under the same conditions as in the preceding experiment, is then reacted with the hydrogen sulfide produced in the synthesis of the diester of dithiophosphoric acid, as in the preceding example. During the course of one hour, the quantity of hydrogen sulfide absorbed is essentially the same as the quantity of hydrogen sulfide produced.

Distillation at a pressure of 4 mm. of mercury, and washing with dilute sodium carbonate solution, gives 5.47 kg. of a solution which contains 3.07 kg. of dimethyl phosphorochloridothioate, practically free of impurities. Yield: 92.3%, based on the dimethyl ester of dithiophosphoric acid, and 85.1% based on the phosphorous pentasulfide.

The two examples described in detail above, demonstrate that the preparation of diesters of phosphorochloridothioic acid may be accomplished in accordance with this invention, in high yield, inexpensively and without the by-products which ordinarily constitute a serious disposal problem because of their nauseating odor. The desired products are obtained practically pure, and are suitable for further synthetic work. The reaction within the scope of the invention is applicable to a wide variety of aliphatic alcohols.

What is claimed is:

1. In a process for the preparation of a diester of phosphorochloridothioic acid of formula:

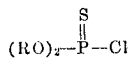

wherein R stands for an alkyl radical containing 1 to 6 carbon atoms by the reaction of chlorine with a dialkyl ester of dithiophosphoric acid of formula:

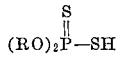

in an inert solvent to produce a mixture of the said diester, hydrogen chloride and sulfur monochloride, the improvement which consists in treating the said mixture with hydrogen sulfide at a mild temperature to convert the sulfur monochloride into hydrogen chloride and sulfur prior to separation of the diester of phosphorochloridothioic acid.

2. The improvement of claim 1 wherein the said dialkyl ester of dithiophosphoric acid used as starting material is produced by the reaction of phosphorus pentasulfide with an alcohol of formula ROH, where R is as defined in claim 1, to produce the said ester and hydrogen sulfide, and the said hydrogen sulfide is collected and utilized to treat the said mixture of diester of phosphorochloridothioic acid and sulfur monochloride.

3. The improvement of claim 1 wherein the reaction with hydrogen sulfide is conducted at temperature between 30° and 40° C.

4. The improvement of claim 1 wherein said diester of phosphorochloridothioic acid is obtained by vacuum distillation of the reaction mixture and washing with water.

References Cited

UNITED STATES PATENTS 3,098,866   7/1963   Divine _____ 260—990 XR
3,356,774   12/1967   Niermann et al. __ 260—986 XR CHARLES B. PARKER, Primary Examiner ANTON H. SUTTO, Assistant Examiner U.S. Cl. X.R.

23—181, 225, 367; 260—990, 981